July 13, 1937.    J. BONTEMPS    2,086,529
SAFETY HINGE
Filed March 9, 1936    2 Sheets-Sheet 1
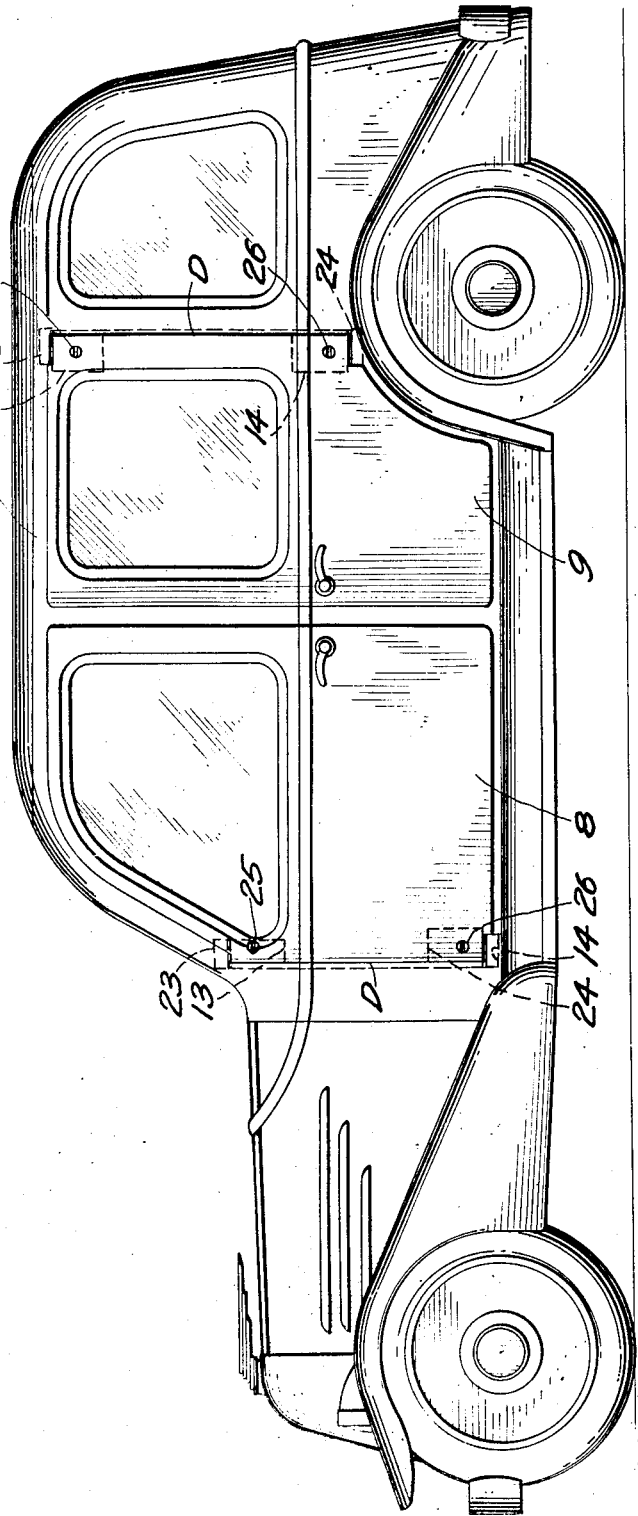
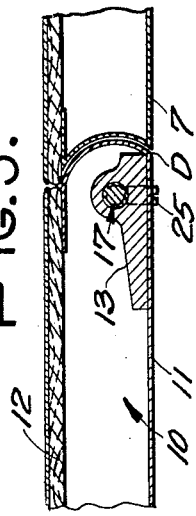
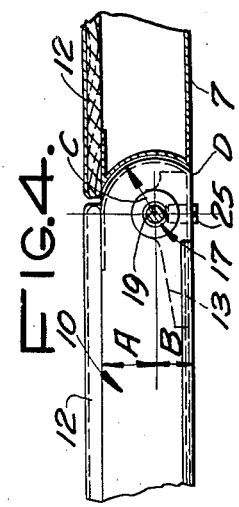
INVENTOR.
JOSEPH BONTEMPS
Louis Casper
ATTORNEY.

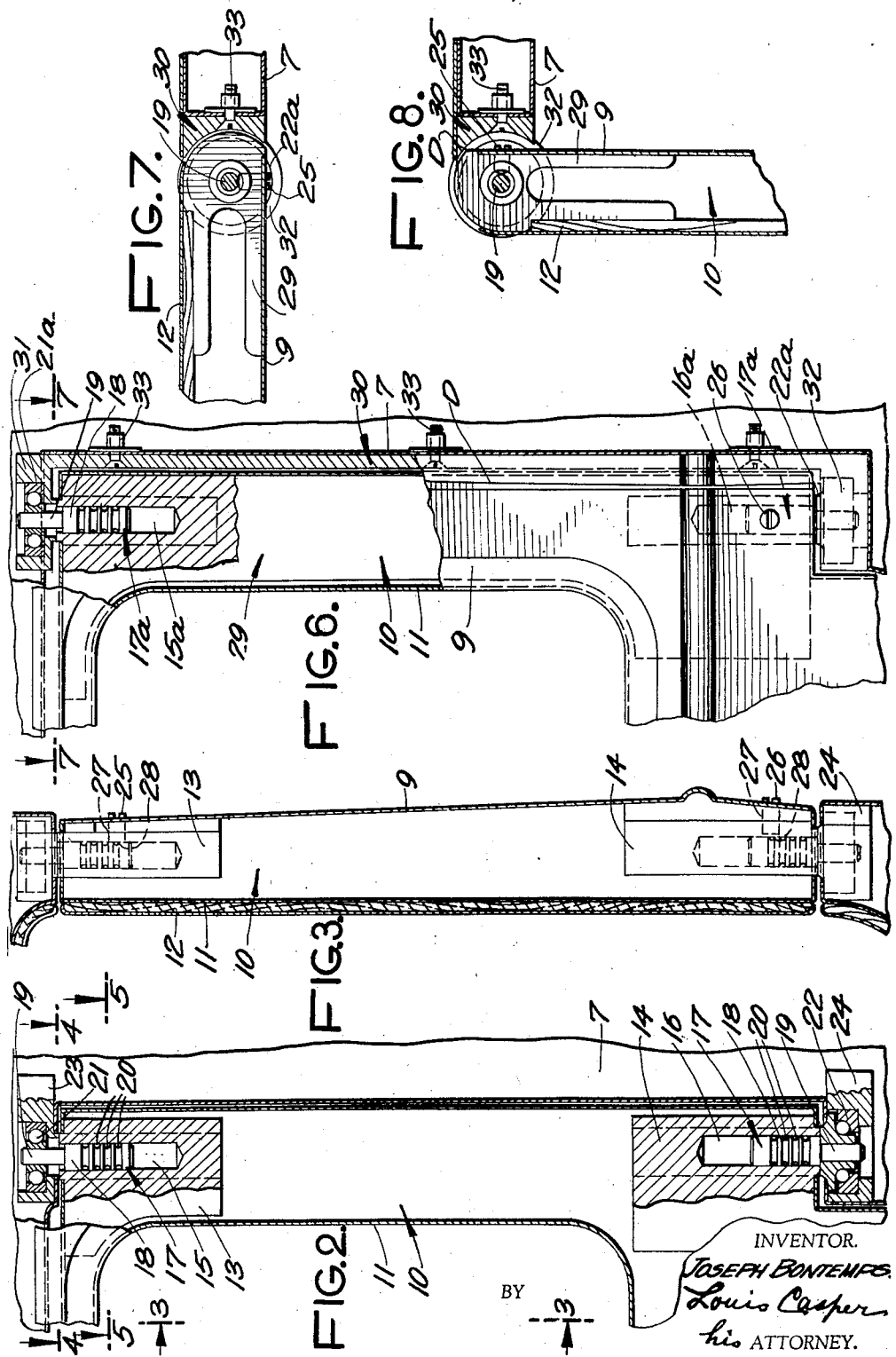

Patented July 13, 1937

2,086,529

UNITED STATES PATENT OFFICE 2,086,529

SAFETY HINGE

Joseph Bontemps, South Ozone Park, N. Y., assignor to Hattie Smith, Brooklyn, N. Y.

Application March 9, 1936, Serial No. 67,841

5 Claims. (Cl. 296—44)

This invention relates to that class of safety hinges and hinge assemblies that are especially adapted for use on doors for automobiles, buses, trucks, railroad cars and the like.

This invention has a further applicability for doors requiring safety in the manner of finger pinching, especially that of children and inmates in hospitals, nursery rooms and such like.

These ends were also the object of my earlier invention in this art, Patent No. 1,986,496 Jan. 1, 1935 to which the present invention is a continuation and constitutes an improvement over my prior invention.

The improvement is directed especially to provide a hinge assembly for a car door devoid of any outer projection whether said door is open or closed and thereby greatly improving the appearance of an automobile and such like. The hinge assembly aforesaid maintains the same space relation between the outside section of the door and the outside section of the body of said automobile no matter whether said door is shut or opened at any angle in which the aforesaid door is moved.

A further object is to provide a hinge assembly for an automobile door that will be free from sag and will provide adequate safety from finger pinching in so far as the hinge assembly is concerned, both at the inside as well as the outside of the automobile aforesaid.

A further object is to provide a hinge assembly that can be incorporated with and made part of the car body in the fabrication thereof; and also in manufacturing the doors a section of the hinge assembly can be incorporated in the make up of said doors.

The hinge assembly as outlined consists of two sections that interlock when the door is hung upon its corresponding support that is fabricated into the door jamb or frame work. The hinging section or swiveling axis of the hinge is located inwardly and off-center with respect to the top and bottom edging of the door and that of the outer shell of the car body.

In this manner of hinge assembly it is not necessary to mount any hinges on the door jamb of the car since, as has been explained, the section of the hinge upon which the door is hung is already fabricated into the car body aforesaid.

In further description of this invention reference is made to the figures in which—

Fig. 1 is a longitudinal side view of an automobile showing the doors and the hinge assembly connected thereto.

Fig. 2 is a cross-section through the top and bottom sections of the hinge assembly of one of the doors of the car showing the thrust bearing and also the bearing assembly.

Fig. 3 is a view taken on a line 3—3 of Fig. 2.
Fig. 4 is a section taken on a line 4—4 of Fig. 2.
Fig. 5 is a section taken on a line 5—5 of Fig. 2.
Fig. 6 shows a section of a modification of the hinge assembly with respect to the hinge construction shown in Figs. 1 to 5 inclusive.

Fig. 7 is a section taken on a line 7—7 of Fig. 6. In this figure the car door is in closed position.

Figure 8 shows the same door shown in Fig. 7 in an open position.

Referring to Figs. 2 and 3, the numeral 10 represents one of the doors of an automobile body. The door proper is made in the usual manner and consists of an outer sheet metal shell 11 and an inner combination wooden frame and fabric lining 12.

An upper casting or forging 13 and a lower casting or forging 14 are each spot welded, screwed or riveted to the outer shell 11 of the door 9. (See Fig. 3.)

The said forgings 13 and 14 are provided with borings or the like 15 and 16. Inside each boring there is fitted a hinge pin 17 which consists of two parts 18 and 19. Part 18 is provided with a series of grooves 20 cut around the circumference of said part. The function of said grooves will be explained hereinafter.

As already stated, part 19 of the hinge pin 17 is somewhat smaller in circumference than part 18 and said part fits inside a bearing 21 on the upper part of the car body. A thrust bearing 22 is affixed into the forging 24 and serves to support the door. Bearings 21 and 22 are seated into the forgings 23 and 24. The forgings aforesaid are either spot welded, screwed or riveted to the body of the car proper. A pair of screws 25, 26 are screwed into the threads 27 of the forgings 13 and 14 from the outside of the door 9. (See Fig. 3.)

These screws are so located that the screw ends thereof which are tapered, fit into the grooves 20 of the hinge pin 17.

Referring to Fig. 6. In this figure there is shown a modified construction of the hinges 13 and 14 shown in Figs. 1 to 5 inclusive. The modification consists of a casting or similarly formed up structure 29 which extends from the top to the bottom sections of the door 10. The said casting is provided with bearings 15ᵃ and 16ᵃ which correspond to the bearings 15 and 16 shown in Fig. 2. A pair of hinge pins 17ᵃ are each inserted into the borings as described.

A casting or similarly formed up structure 30 which extends from the top to the bottom side sections of the door jamb of the car proper, is provided with extension members 31 and 32. The member 31 supports a top bearing 21ᵃ and member 32 supports the thrust bearing 22ᵃ.

The screw 26 is screwed into the casting 29 for reason to be hereinafter explained.

The casting 29 is secured to the body of the door 10 by means of spot welding, rivets or screws. The casting 30 is likewise secured to the body of the car by means of the screws 33.

In manufacturing the body of the car involving the hinge assembly as described, the forgings 23 and 24 are preferably spot welded to the body of the car as shown in Fig. 1. The forgings 13 and 14 are also preferably spot welded to the body of the door.

When the car body is ready to receive the doors, the bearings 21 and 22 are inserted into the forgings 23 and 24. Likewise hinge pins 17 are inserted into the bearings 15 and 16. The door is then ready to be fitted into the door opening of the car.

A screw driver or like tool is inserted into the threaded openings 27, and the pins 17 are forced into the bearings 21 and 22 by means of said tool. In this connection the circumferential grooves 20 are used as a pry for this purpose.

When parts 19 of the hinge pin 17 are firmly seated into the bearings, the screws 25 and 26 are screwed into the threaded openings 27 until the tapered screw ends 28 fit into one of the grooves 20 thus holding the hinge pin 17 substantially in place. It will be noted that the screws 25 and 26 have no function in supporting the door, but said screws merely hold the hinge pins 17 and 18 in substantial position as shown in the drawings.

When it is necessary to remove the door from the car body proper, the screws 25 and 26 are removed from the threaded openings 27. A screw driver or like tool is inserted into said openings and pins 17 are forced or pried out from the bearings 21 and 22. The grooves 20 are utilized in the prying process.

Referring to Figs. 4 and 5. In these figures it will be noticed that the hinge axis of the door is not located at or near the center of the top or lower edge of the door, but that the distance A from the inside wall of the car is greater than the distance B to the outside wall of the car. The distance B is less than the radius C which the door describes when rotated on its hinges. Thus, when the door is closed, there is presented to view exteriorly a narrow edge D. This is in contrast with the contour of the hinging section of the door in a closed position as shown in my previous Patent No. 1,986,496.

In mounting ordinary types of hinges on automobile doors, it is necessary to provide a substantial and sturdy stanchion support on the hinging side of the door opening in order to adequately support the hinge member that is screwed into the side of said door opening. Usually as many as six screws are required for each hinge member which is screwed into the top and bottom sections of said side door opening.

With the present invention the support for the door is virtually the car body itself since the castings 23 and 24 are an integral part of said car body. Likewise the supporting castings 13 and 14 are made integral to the car door, hence the support of the hinging member on the door proper is that of the entire door itself. This arrangement of hinge construction is in contrast with ordinary types of hinges which are dependent upon screws virtually to support the door to the car body.

It will thus be seen with a hinge assembly comprising the present invention a manufacturer is enabled to produce a car body eliminating therefrom the hinge supporting stanchion, and also to provide a better appearing car devoid of outer hinge projections.

In actual manufacture of the car body with the present invention, the hinge supports are fabricated directly into said body. The larger proportion of the hinge assembly, however is incorporated into the car door.

A considerable amount of time can be saved in mounting of the doors with the present invention as compared with mounting of the doors upon a car body with ordinary type hinges.

When it is desired to remove the door, both top and bottom screws 25 and 26 which are located on the door are removed, and after said removal, a screw driver or similar tool is inserted through the threaded openings 27 and then to pry by means of said tool the hinge pins 17 from off the hinge bearings. After this has been accomplished, the door is ready for removal. The reverse procedure is performed to mount the door as previously explained.

A further desirable feature is that the hinging section being curvilinear in construction conforms precisely with the curved outline of the space of the door siding upon which said door is mounted. This manner of mounting makes possible a close space relation between the door and the door siding which is maintained at both inside and outside of the car regardless of the position of the car door whether open or closed.

This invention makes possible a draft and weather proof door since no rain or air draft can pass through the hinging edge of the door, the air gap as already stated between said hinging edge of the door and the door jamb of the side adjacent to the door edge being always the same whether said door is open or closed.

Now, having described my invention, what I claim is—

1. In a hinge assembly of the class described supporting a door upon a door frame or the like; said assembly comprising metal sections fabricated into said door, metal sections fabricated into said door frame adjacent to and complementary to said metal sections in said door; a bore or the like in each of said metal sections; the axis of said bores in said door metal sections being eccentric with respect to the top and bottom transverse edge of said door; hinge pins affixed in said bores for joining and holding said metal sections on said door frame with corresponding metal sections on said door; and pin securing means operable through the door face for holding said hinge pins in position.

2. The structure as set forth in claim 1 each of said hinge pins having two integral parts, one part thereof fitting into a thrust bearing in each of said borings in said door frame metal sections, and the opposite hinge pin part having a series of circumferential grooves formed thereon.

3. A hinge assembly for an automobile body comprising a door having top and bottom metal sections fabricated therein, a boring provided in each of said sections; a hinge pin projecting inwardly into each of said borings; a top and bottom metal section fabricated into said automobile body, a boring in each of said sections; a thrust bearing affixed in each of said borings, each of said thrust bearings receiving said hinge pins at their outward ends; a series of circumferential grooves formed around said hinge pins, and setting means that fit into said grooves of each of the hinge pins aforesaid.

4. In a door hinge, a door carried support provided with a socket axially elongated in the swing axis of the door, a pintle movable axially in said socket for retraction entirely therein and projection therefrom, a tool receiving bore provided in said door between said socket and a door face whereby said pintle may be moved as desired axially of the socket, and set screw means engageable through said bore with the pintle whereby to maintain same in a set position.

5. In a door hinge, a door carried support having a pintle housing socket in the swing axis of the door, a pintle movable axially in said socket, tool engageable means circumferentially disposed on a portion of said pintle within the socket, said support having a lateral tool receiving bore communicating between a door face and the socket, and securing means engageable through the bore with said pintle to maintain same in a set position.

JOSEPH BONTEMPS.